United States Patent
Yebka et al.

(10) Patent No.: US 10,840,720 B2
(45) Date of Patent: Nov. 17, 2020

(54) RESTRICTING BATTERY CHARGING

(71) Applicant: LENOVO (Singapore) PTE. LTD., New Tech Park (SG)

(72) Inventors: Bouziane Yebka, Apex, NC (US); Larry Glenn Estes, Durham, NC (US); Jeremy Robert Carlson, Cary, NC (US); Philip John Jakes, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 343 days.

(21) Appl. No.: 15/941,867

(22) Filed: Mar. 30, 2018

(65) Prior Publication Data

US 2019/0305564 A1 Oct. 3, 2019

(51) Int. Cl.
*H02J 7/00* (2006.01)

(52) U.S. Cl.
CPC ............ *H02J 7/007* (2013.01); *H02J 7/0068* (2013.01)

(58) Field of Classification Search
CPC ........ H02J 7/007; H02J 7/0068; H02J 7/0047; H02J 7/0048; H02J 7/0091
USPC .................................................. 320/150, 134
See application file for complete search history.

(56) References Cited

U.S. PATENT DOCUMENTS

| | | | | | |
|---|---|---|---|---|---|
| 3,794,905 | A | * | 2/1974 | Long | H02J 7/007184 320/161 |
| 4,583,035 | A | * | 4/1986 | Sloan | H02J 7/1461 320/107 |
| 6,002,237 | A | * | 12/1999 | Gaza | H02J 7/00712 320/116 |
| 6,937,894 | B1 | * | 8/2005 | Isaac | A61N 1/3787 607/34 |
| 7,710,078 | B2 | * | 5/2010 | Miller | H02J 7/0091 320/150 |
| 10,587,141 | B2 | * | 3/2020 | Raikar | H02J 7/042 |
| 10,608,443 | B2 | * | 3/2020 | Thompson | H01M 10/486 |
| 2008/0218126 | A1 | * | 9/2008 | Bansal | H02J 7/0069 320/132 |

* cited by examiner

*Primary Examiner* — M Baye Diao
(74) *Attorney, Agent, or Firm* — Kunzler Bean & Adamson

(57) ABSTRACT

For selectively restricting the charge level of a battery, methods, apparatus, and systems are disclosed. One apparatus includes a battery, a temperature sensor that measures a temperature of the battery, a processor, and a memory that stores code executable by the processor. Here, the processor selects a maximum charge level using the temperature of the battery, where the maximum charge becomes less than a full charge level of the battery in response to the battery temperature being above a threshold temperature. Moreover, the processor restricts charging of the battery to the maximum charge level in response to the temperature of the battery being above the threshold temperature.

20 Claims, 12 Drawing Sheets

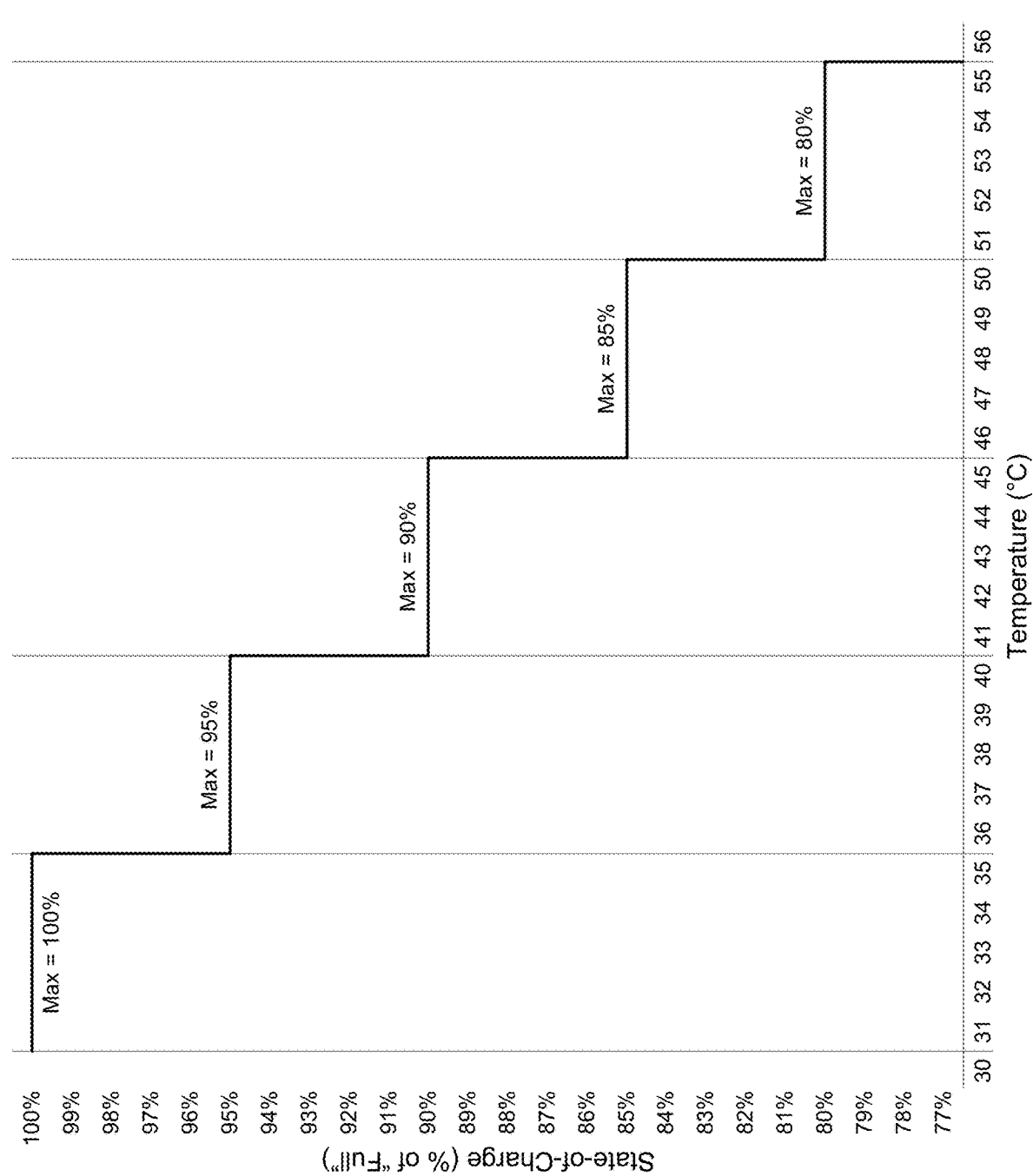

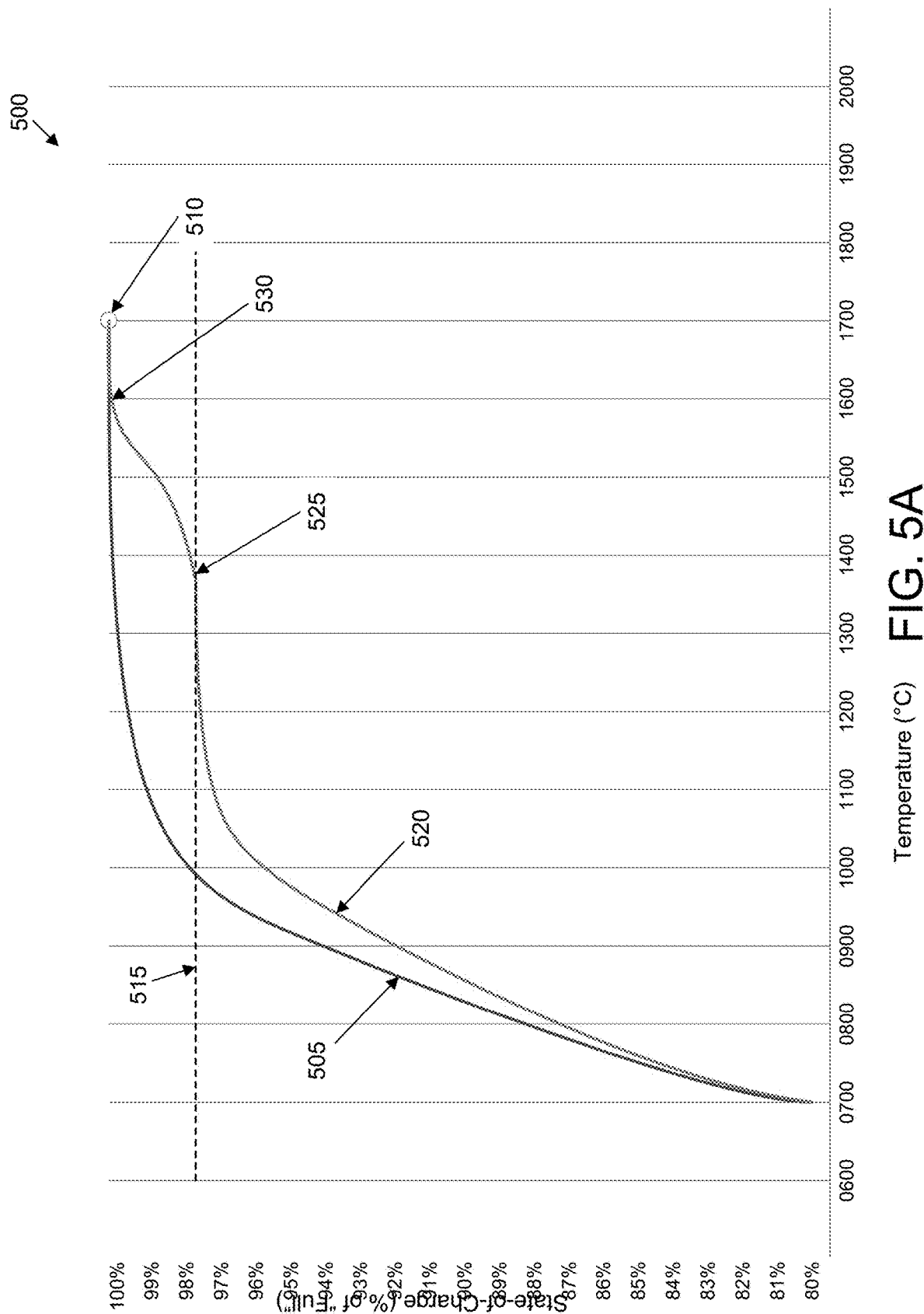

RESTRICTING BATTERY CHARGING

FIELD

The subject matter disclosed herein relates to charging a battery and more particularly relates to selectively restricting the level to which a battery is charged.

BACKGROUND

Battery packs experience degradation at full charge.

BRIEF SUMMARY

An apparatus for selectively restricting the charge level of a battery is disclosed. A method and computer program product also perform the functions of the apparatus.

One apparatus for selectively restricting the charge level of a battery includes a battery, a temperature sensor that measures a temperature of the battery, a processor, and a memory that stores code executable by the processor. Here, the processor selects a maximum charge level using the temperature of the battery, where the maximum charge becomes less than a full charge level of the battery in response to the battery temperature being above a threshold temperature. Moreover, the processor restricts charging of the battery to the maximum charge level in response to the temperature of the battery being above the threshold temperature.

In some embodiments, the processor adjusts the maximum charge level as the temperature of the battery changes. In one embodiment, the maximum charge level decreases linearly as the temperature increases. In another embodiment, the maximum charge level decreases step-wise as the temperature of the battery increases.

In certain embodiments, the threshold temperature is selected based on a battery chemistry of the battery. In certain embodiments, the processor permits charging of the battery to a full charge level in response to the temperature of the battery being at or below the threshold temperature.

In some embodiments, the processor further acquires a charging profile of the battery, the charging profile indicating a pattern of times when connecting the battery to the charger and times when disconnecting the battery from the charger. The processor selects a time to permit a full charge of the battery based on the charging profile and restricts a charge level of the battery to an intermediate charge level prior to the selected time. In certain embodiments, the processor allows the battery to charge to the full charge level upon reaching the selected time. Here, the intermediate charge level is based on the battery temperature.

In some embodiments, the processor monitors an amount of time the charge level of the battery remains at the full charge level and discharges the battery to an intermediate charge level in response to the time the charge level of the battery remains at the full charge level reaching a threshold amount of time. In one embodiment, the intermediate charge level is based on the battery temperature.

One method for selectively restricting the charge level of a battery includes acquiring, by use of a processor, a charging profile for an electronic device having a rechargeable battery, the electronic device coupled to a charger. The method includes selecting a time to permit a full charge of the battery based on the charging profile. The method includes restricting a charge level of the battery to an intermediate charge level prior to the selected time, the intermediate charge level being less than the full charge level.

In some embodiments, the method includes allowing the battery to charge to the full charge upon reaching the selected time. In certain embodiments, the charging profile indicates a pattern of times when connecting the battery to the charger and times when disconnecting the battery from the charger. In some embodiments, the method includes predicting a time-of-use based on the charging profile. Here, the time to permit the full charge of the battery is a predetermined interval prior to the predicted time-of-use.

In certain embodiments, the method includes monitoring a temperature of the battery and selecting a maximum charge level using the temperature of the battery. Here, the maximum charge becomes less than a full charge level of the battery in response to the battery temperature being above a threshold temperature. The method may further include restricting charging of the battery to the maximum charge level in response to the temperature of the battery being above the threshold temperature. Moreover, the method may include permitting charging of the battery to a full charge level in response to the temperature of the battery being at or below the threshold temperature.

In some embodiments, the method includes monitoring an amount of time the charge level of the battery remains at the full charge level. Here, the method may also include discharging the battery to the intermediate charge level in response to the time the charge level of the battery remains at the full charge level reaching a threshold amount of time.

One program product for selectively restricting the charge level of a battery includes a computer readable storage medium that stores code executable by a processor. In one embodiment, the computer readable storage medium does not include transitory signals. Moreover, the executable code may include code that monitors a temperature of a battery connected to a charger, acquires a charging profile for the battery, the charging profile indicating a pattern of times when connecting the battery to the charger and times when disconnecting the battery from the charger, selects a time to permit a maximum charge level based on the charging profile, the maximum charge level being based on the battery temperature, restricts charging of the battery to an intermediate charge level prior to the selected time, and permits charging of the battery to the maximum charge level upon reaching the selected time.

In some embodiments, the program product includes code that predicts a time-of-use based on the charging profile. Here, the selected time is a predetermined interval prior to the predicted time-of-use. Moreover, the maximum charge level may less than a full charge level in response to the battery temperature being above a threshold temperature. In certain embodiments, permitting charging of the battery to the maximum charge level upon reaching the selected time includes charging the battery to the full charge level in response to the battery temperature being less than or equal to the threshold temperature.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a diagram illustrating one embodiment of a first chart 400 of maximum charge levels at various temperatures;

FIG. 5A is a diagram illustrating one embodiment of a first set 500 of charging algorithms, according to embodiments of the disclosure;

DETAILED DESCRIPTION

Figure 1:
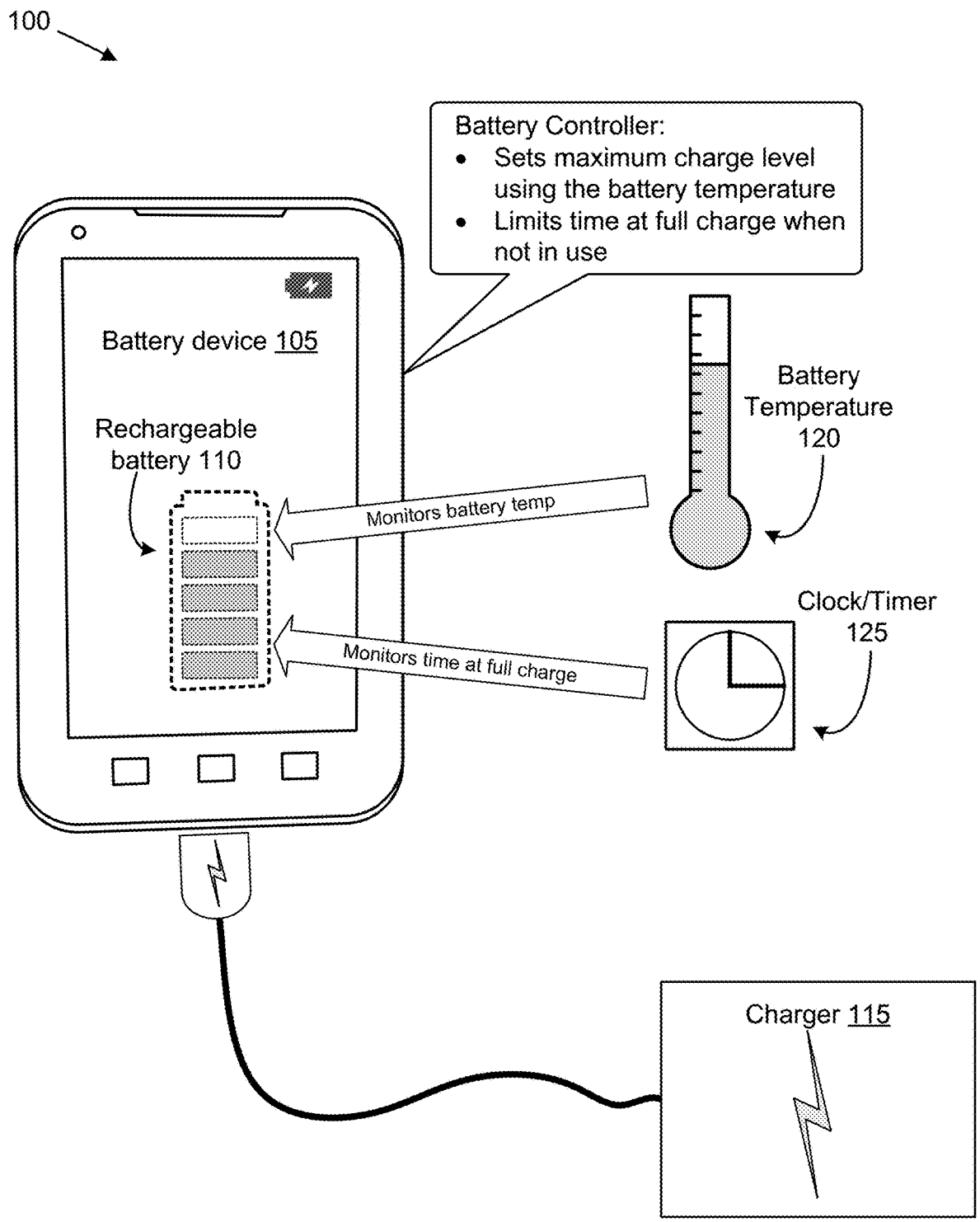
FIG. 1 is a schematic block diagram illustrating one embodiment of a system for selectively restricting the charge level of a battery.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For selectively restricting the charge level of a battery, methods, systems, and apparatuses are disclosed herein. Because temperature has a significant impact on the performance, safety, and cycle lifetime of rechargeable batteries, particularly for lithium-ion batteries, the present disclosure describes various ways to manage a charge level of a battery. As used herein, a "charge level" refers to an amount of charge of a battery relative to a "full" charge. The charge level is also referred to as the "state-of-charge" of a battery. Generally, the charge level is expressed as a percentage of the full charge level.

In one embodiment, the charge level is determined by measuring a voltage of the battery (e.g., across the battery terminals) and comparing the measured voltage to a discharge curve (e.g., that empirically correlates the voltage to the "charge level" or "state-of-charge"). In certain embodiments, the voltage is affected by the amount of current passing through the battery and/or the temperature of the battery. Thus, in certain embodiments, the discharge curve also correlates the voltage and the temperature and/or current to the charge level.

In another embodiment, the charge level is determined by integrating the battery current over time, also referred to a "Coulomb counting" technique. In other embodiments, the charge level is determined by a combination of discharge curve and Coulomb counting.

Because an increased degradation rate is found mainly during extended storage at full charge and accelerates at elevated temperature, the disclosed embodiments reduce the time at full charge when not in use, reduce the charge limit at high temperature, or both reduce the time at full charge when not in use and reduce the charge limit at high temperature. In certain embodiments, a charging algorithm is adjusted to reduce the time at full charge when not in use and/or reduce the charge limit at high temperature. Moreover, a charging algorithm may be adjusted based on a user schedule, a condition of the battery, a battery age, and/or a number of charge/discharge cycles.

FIG. 1 depicts a system 100 for selectively restricting the charge level of a battery, according to embodiments of the disclosure. The system 100 includes a battery device 105 having a rechargeable battery 110 and a charger 115 capable of recharging the rechargeable battery 110. The battery device 110 may be any device having a rechargeable battery 110. A battery controller (not shown) controls the recharging of the battery. In one embodiment, the battery controller is a part of the charger 115. In another embodiment, the battery controller is a part of the battery device 105. In yet another embodiment, the battery controller is a part of the rechargeable battery 110.

The battery controller minimizes degradation of the rechargeable battery due to full charge, according to the principles described herein. In some embodiments, the battery controller monitors the temperature 120 of the rechargeable battery 110 and sets a maximum charge level of the rechargeable battery 110. Here, the maximum charge level is less than the full charge level of the rechargeable battery when the battery temperature 120 becomes greater than a threshold temperature. Moreover, the maximum charge level may be a dynamic level that changes according to the battery temperature 120. Examples of dynamic charge levels are described below with reference to FIG. 4A-4C.

In some embodiments, the battery controller, using a clock or time 125, monitors a time that the rechargeable battery 110 is at a full charge level (e.g., a state-of-charge of "100%") while not in use and adjusts a charging algorithm used to charge the rechargeable battery 110 in order to limit the time it remains unused at full charge. In one embodiment, the battery controller restricts the charge level to no more than an intermediate charge level (e.g., 95% state-of-charge) while the rechargeable battery 110 is coupled to the charger 115 but not expected to be in use. In another embodiment, the battery controller discharges the rechargeable battery by a certain (e.g., small) amount if the rechargeable battery is unused while at a full charge level for more than a threshold amount of time. In certain embodiments, the battery controller both restricts the charge level based on a battery temperature and limits the time the rechargeable battery is at full charge when not in use, as described in greater detail below.

Figure 2:
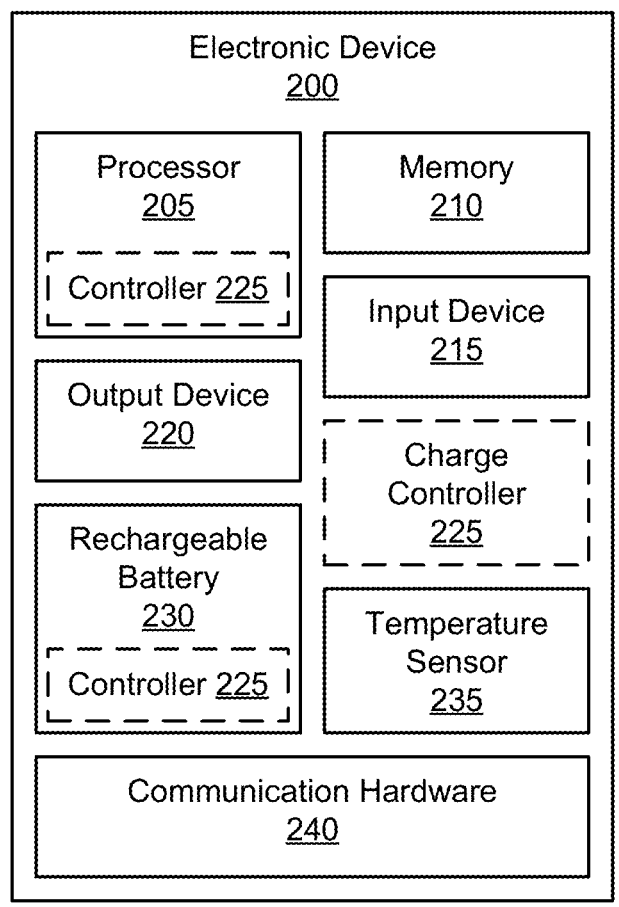
FIG. 2 is a schematic block diagram illustrating one embodiment of an apparatus for selectively restricting the charge level of a battery.

FIG. 2 depicts an apparatus for selectively restricting the charge level of a battery, according to embodiments of the disclosure. In the depicted example, the apparatus is embodied as an electronic device 200. The electronic device 200 may be one embodiment of the battery device 105, discussed above. The electronic device 200 may include a processor 205, a memory 210, and a temperature sensor 235. Moreover, the electronic device includes a rechargeable battery 230. The rechargeable battery 230 may be one embodiment of the rechargeable battery 110 described above.

In various embodiments, the electronic device may optionally include an input device 215, an output device 220, and/or communication hardware 240. The electronic device 200 may include a body or an enclosure, with the components of the electronic device 200 being located within the enclosure. Moreover, the components of the electronic device 200 are communicatively coupled to each other, for example via a computer bus Examples of an electronic device 200 include, but are not limited to, a computer, a laptop computer, a table computer, a mobile telephone, a smartphone, a wearable computer, a wearable electronic device, a gaming console, a gaming controller, a media player, a wireless audio device, a wireless microphone, a fitness tracker, a health monitor, a digital camera, an electric vehicle (including an autonomous electric vehicle), a hybrid vehicle (including an autonomous hybrid vehicle), a personal transport device, a personal mobility device, a mobility aid, a hearing aid, a home battery, a building energy storage device, a battery pack, a smart battery pack, or any other suitable device containing a battery. The scope of this disclosure is not intended to be limited to a specific electronic device or class of electronic device.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, or similar programmable controller. In some embodiments, the processor 205 executes instructions stored in the memory 210 to perform the methods and routines described herein. The processor 205 is communicatively coupled to the memory 110, the input device 215, the output device 220, the charge controller 225, the temperature sensor 235, the rechargeable battery 230, and the communication hardware 240. In certain embodiments, the processor 205 may perform the methods described herein.

The memory 210, in one embodiment, is a computer readable storage medium. In some embodiments, the memory 210 includes volatile computer storage media. For example, the memory 210 may include a random-access memory (RAM), including dynamic RAM (DRAM), synchronous dynamic RAM (SDRAM), and/or static RAM (SRAM). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to selectively restricting charging of a battery. For example, the memory 210 may store charge levels, discharge curves, charging algorithms, battery temperatures, charging histories/profiles, battery statistics, and the like. In one embodiment, the memory 210 includes a set of registers storing the data discussed below with reference to FIG. 3B. In some embodiments, the memory 210 also stores program code and related data, such as an operating system operating on the electronic device 200. In one embodiment, the charge controller 225 may be embodied in a software application (or set of software applications) stored in the memory 210 and operating on the electronic device 200.

The input device 215, in one embodiment, may comprise any known computer input device including a touch panel, a button, a keyboard, a microphone, a camera, and the like. For example, the input device 215 may include a microphone or similar audio input device with which a user inputs sound or voice data (e.g., voice commands). In some embodiments, the input device 215 (or portion thereof) may be integrated with the output device 220, for example, as a touchscreen or similar touch-sensitive display. In some embodiments, the input device 215 comprises two or more different devices, such as a microphone and a touch panel. The input device 215 may include a camera for capturing images or otherwise inputting visual data.

The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In certain embodiments, the output device 220 includes one or more speakers for producing sound, such as an audible alert or notification. In some embodiments, the output device 220 includes one or more haptic devices for producing vibrations, motion, or other haptic output.

In some embodiments, all or portions of the output device 220 may be integrated with the input device 215. For example, the input device 215 and output device 220 may form a touchscreen or similar touch-sensitive display. As another example, the input device 215 and output device 220 may form a display that includes haptic response mechanisms. In other embodiments, the output device 220 may be located near the input device 215. For example, a camera, microphone, speakers, and touchscreen may all be located on a common surface of the electronic device 200. The output device 220 may receive instructions and/or data for output from the processor 205 and/or the charge controller 225.

The charge controller 225, in one embodiment, is configures to control the charging of the rechargeable battery 230. In one embodiment, the charge controller 225 is embodied in the processor 205, for example as a software algorithm run on the processor 205 or as a microcontroller integrated with the processor 205 chip. In another embodiment, the charge controller 225 may be built into the rechargeable battery 230, for example as a built-in battery management system. In other embodiments, the charge controller 225 is a separate and independent component of the electronic device 200, for example a dedicated integrated circuit or power management unit of the electronic device 200.

In some embodiments, the charge controller 225 determines a temperature of the rechargeable battery 230 and selects a maximum charge level using the temperature of the battery, where the maximum charge becomes less than a full charge level of the battery in response to the battery temperature being above a threshold temperature. Moreover, the charge controller 225 may restrict charging of the battery to the maximum charge level in response to the temperature of the battery being above the threshold temperature.

In some embodiments, the charge controller 225 acquires a charging profile associated with the rechargeable battery 230 (e.g., showing a charging history of the battery) and selecting a time to permit a full charge of the battery based on the charging profile. The charge controller 225 then restricts a charge level of the battery to an intermediate charge level (less than the full charge level) prior to the selected time, thereby minimizing the time the rechargeable battery 230 spends at full charge while not in use. Here, the charge controller 225 may predict a time-of-use based on the charging profile, with the selected time being a predetermined interval prior to the time-of-use. Moreover, the charge controller 225 may additionally limit charging of the battery after the selected time to the maximum charge level in response to the temperature of the battery being above the threshold temperature.

The rechargeable battery 230, in one embodiment, is configured to supply electrical power to the electronic device 200. Moreover, the rechargeable battery 230 is configured to be charged under the control of the charge controller 225. In one embodiment, the rechargeable battery 230 is integrated with the electronic device (e.g., a "built-in" battery that is not consumer removable). In another embodiment, the rechargeable battery 230 is a removable battery that is selectively coupled to, or decoupled from, the electronic device.

The rechargeable battery 230 may be a chemical battery containing one or more electrochemical cells that can be charged, discharged into a load, and recharged multiple times. The rechargeable battery 230 may use one of a plurality of electrode and electrolyte combinations, referred to a "battery chemistry." Moreover, it is understood that different battery chemistries produce different voltages, energy densities, lifetimes, etc. For example, lithium batteries may use different electrolyte solutions, such as designations LP30, LP40, LP47, LP50, LP57, LP71, LP100, LF100 (each having different solvent mixtures and/or different electrolyte salts), resulting in different electrical properties of the electrochemical cell. Accordingly, the charge controller 225 may select the charge levels (e.g., the temperature-based maximum charge level or the intermediate charge level), threshold temperatures, and/or maximum times at full charge based on particular battery chemistry of the rechargeable battery 230.

The temperature sensor 235, in one embodiment, is configured to measure a temperature of the rechargeable battery 230. In some embodiments, the temperature sensor 235 is co-located with the rechargeable battery 230. For example, the temperature sensor 235 may be placed between cells of the rechargeable battery. Where the rechargeable battery 230 is removable, the temperature sensor 235 may be located in a battery enclosure of the removable battery. In other embodiments, the temperature sensor 235 is located in adjacent to the rechargeable battery 230. Moreover, the electronic device 200 may include a plurality of temperature sensors 235 located in and/or adjacent to the rechargeable battery 230. In various embodiments, the processor 205 and/or charge controller 225 may monitor a temperature of the rechargeable battery 230 using the temperature sensor(s) 235.

The communication hardware 240 may support wired or wireless communication between the electronic device and another device or network. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

As described above, the charge controller 225 selectively restricting the charge level of a battery based on battery temperature and/or a time at full charge without being used.

Figures 3A, 3B:
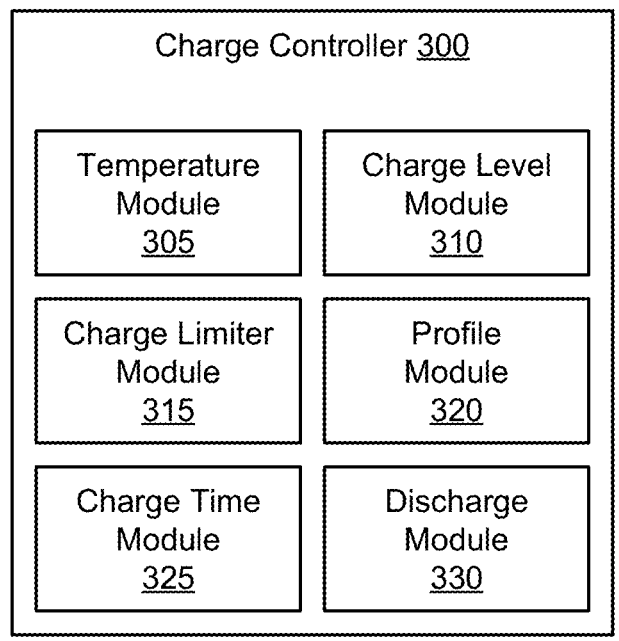
FIG. 3A is a schematic block diagram illustrating one embodiment of a charge controller for selectively restricting the charge level of a battery.
FIG. 3B is a block diagram illustrating one embodiment of a data structure for selectively restricting the charge level of a battery.

FIG. 3A depicts a charge controller 300, according to embodiments of the disclosure. Here, the charge controller 300 may be a battery controller for selectively restricting the charge level of a battery. Moreover, the charge controller 300 may be one embodiment of the charge controller 225 described above. In the depicted embodiment, the charge controller 300 includes a plurality of modules, including a temperature module 305, a charge level module 310, a charge limiter module 315, a profile module 320, a charge time module 325, and a discharge module 330. As described above, the modules 305-330 may be implemented as a hardware circuit, a programmable hardware device, or software for execution by various types of processors.

The temperature module 305, in one embodiment, is configured to measure a temperature of the battery. In one embodiment, the temperature module 305 is coupled to the temperature sensor 235, receives signals from the temperature sensor 235, and converts said signals into temperature data. In various embodiments, temperature module 305 continually monitors the temperature of the battery ("battery temperature") while the battery is connected to the charger. In some embodiments, the temperature module 305 determines whether the battery temperature exceeds a threshold temperature. Here, the threshold temperature may be selected based on a battery chemistry of the battery.

The charge level module 310, in one embodiment, is configured to select a maximum charge level using the temperature of the battery, where the maximum charge becomes less than a full charge level of the battery in response to the battery temperature being above a threshold temperature. Wherein the processor adjusts the maximum charge level as the temperature of the battery changes. Wherein the maximum charge level decreases linearly as the temperature increases. Wherein the maximum charge level decreases step-wise as the temperature of the battery increases. In various embodiments, the charge level module 310 also monitors a current charge level of the battery.

The charge limiter module 315, in one embodiment, is configured to restrict charging of the battery to the maximum charge level in response to the temperature of the battery being above the threshold temperature. Moreover, the charge limiter module 315 permits charging of the battery to a full charge level in response to the temperature of the battery being at or below the threshold temperature.

The profile module 320, in one embodiment, is configured to acquire a charging profile of the battery. In one embodiment, the charging profile indicates a pattern of times when connecting the battery to the charger and times when disconnecting the battery from the charger. In certain embodiments, the profile module 320 correlates times an electronic device containing the battery is connected to a charger, times the electronic device is disconnected from the battery, and a duration of the charging of the battery.

Moreover, the profile module 320 uses the charging profile to select a time to permit a full charge of the battery. Here, the times the electronic device is disconnected from the battery, and a duration of the charging of the battery are particularly relevant. The charge limiter module 315 restricts a charge level of the battery to an intermediate charge level prior to the selected time. In one embodiment, the intermediate charge level is a predetermined percentage of the full charge level (e.g., 95% of full). In another embodiment, the intermediate charge level is based on the battery temperature. For example, the intermediate charge level may a predetermined percentage (e.g., 97%) of the maximum charge level determined by the charge level module 310, thus based the battery temperature.

In certain embodiments, selecting the time to permit a full charge of the battery includes the profile module 320 predicting a time-of-use based on the charging profile. Here, the time to permit the full charge of the battery is then selected as a predetermined amount of time (e.g., 1 hour) prior to the predicted time-of-use. In one embodiment, the predetermined amount of time prior to the predicted time-of-use is set based on the amount of time needed to charge the battery from the intermediate charge level to the full charge level. In another embodiment, the predetermined amount of time prior to the predicted time-of-use may be based on one or more of: an age of the battery (e.g., time since manufacture and/or time since first use), a condition of the battery, a number of charge cycles, and the like.

In certain embodiments, the charge limiter module 315 allows the battery to charge to the full charge level upon reaching the selected time. Note, however, that the charge level module 310 and/or charge limiter module 315 may restrict charging of the battery to a maximum level based on the battery temperature, despite having reached the selected time. Thus, the final charge level (e.g., the charge level at the predicted time-of-use or at a time the user disconnects the battery/device from the charger) may be less than the full charge level due to the battery temperature being greater than the threshold temperature.

The charge time module 325 monitors an amount of time the charge level of the battery remains at the full charge level. In response to the time the charge level of the battery remains at the full charge level reaching a threshold amount of time, the charge time module 325 signals the discharge module 330 to discharge the battery to an intermediate charge level. In one embodiment, the intermediate charge level is based on the battery temperature. Here, the threshold amount of time may be based on one or more of: an age of the battery (e.g., time since manufacture and/or time since first use), a condition of the battery, a number of charge cycles, and the like.

The discharge module 330 is configured to discharge the battery (e.g., from a full charge level) in response to certain conditions being met. In one embodiment, the discharge module 330 discharges the battery from the full charge level to an intermediate charge level in response to the battery being at the full charge level for a threshold amount of time. This intermediate level may be the same intermediate level used with the charging profile, or may be a second intermediate level. In certain embodiments, the intermediate level is based on the battery temperature. For example, the intermediate level may be a percentage (e.g., 98%) of the maximum charge level (e.g., selected using the battery temperature).

Additionally, the discharge module 330 may discharge the battery from a current charge level (e.g., the full charge level) to a third intermediate charge level in response to the current battery charge level exceeding the maximum charge level determined using the battery temperature. This third intermediate level may be the same intermediate level used with the charging profile, or may be interpedently set. In one embodiment, the third intermediate level is set to the maximum charge level as determined using the battery temperature, therefore the discharge module 330 discharges the battery from the full charge level (or current) to the maximum charge level. Moreover, because sufficient heat may be generated during the discharge process to lower the maximum charge level, the third intermediate level may be dynamically adjusted as the maximum charge level changes.

In another embodiment, the third intermediate level is set to a percentage (e.g., 98%) of the maximum charge level, to account for heat generated during the battery discharge.

FIG. 3B depicts an exemplary data structure 350 storing parameters for selectively restricting the charge level of a battery. As depicted, the data structure 350 contains a plurality of fields. In one embodiment, each field is stored in a register, for example of a charge controller 225 or a charge controller 300. In another embodiment, the data structure 350 is stored in the memory 210. The data structure 350 stores data used in selectively restricting the charge level of a battery.

The data structure 350 may include one or more of: a field 355 storing a current battery temperature ("current_battery_temp"), a field 360 storing a temperature threshold ("temp_threshold"), a field 365 storing a maximum charge level ("max_charge_level"), a field 370 storing a maximum time the battery is permitted to remain at full charge ("max_time_at_full"), a field 375 storing a first intermediate charge level ("int_charge_level_1"), a field 380 storing a second intermediate charge level ("int_charge_level_2"), a field 385 storing a third intermediate charge level ("int_charge_level_3"), a field 390 storing a predicted time-of-use ("time_of_use"), and a field 395 storing a current time ("current_time"). In further embodiments, additional data may be stored in the data structure 350, including a current charge level, a charging profile, one or more charging algorithms, or the like. In certain embodiments, the temperature module 305 may store the current battery temperature and the threshold temperature, the charge level module 310 may store the maximum charge level and one or more intermediate charge levels, the charge time module 325 may store the maximum time the battery is permitted to remain at full charge, and the profile module 320 may store the predicted time-of-use.

FIG. 4A depicts a first chart 400 of maximum charge levels at various temperatures, according to embodiments of the disclosure. Here, the first chart 400 depicts the maximum charge level decreasing step-wise as the temperature of the battery increases. In the example of FIG. 4A, a battery controller (such as the charge controller 225 and/or the charge controller 300) allows up to the full charge (e.g., state-of-charge at 100%) until the battery temperature reaches 36° Celsius. At this point, the battery controller restricts charging to a level less than the full charge. From 36° C. to 40° C., the battery controller prevents the battery from being charged to more than 95% state-of-charge. From 41° C. to 45° C., the battery controller prevents the battery from being charged to more than 90% state-of-charge. From 46° C. to 50° C., the battery controller prevents the battery from being charged to more than 85% state-of-charge. From 51° C. to 55° C., the battery controller prevents the battery from being charged to more than 80% state-of-charge. In one embodiment, the battery controller lowers the maximum charge level to less than 80% state-of-charge for temperatures 56° C. or higher. In another embodiment, the battery controller sets the maximum charge level to 80% state-of-charge for temperatures 51° C. or higher.

Figure 4B:
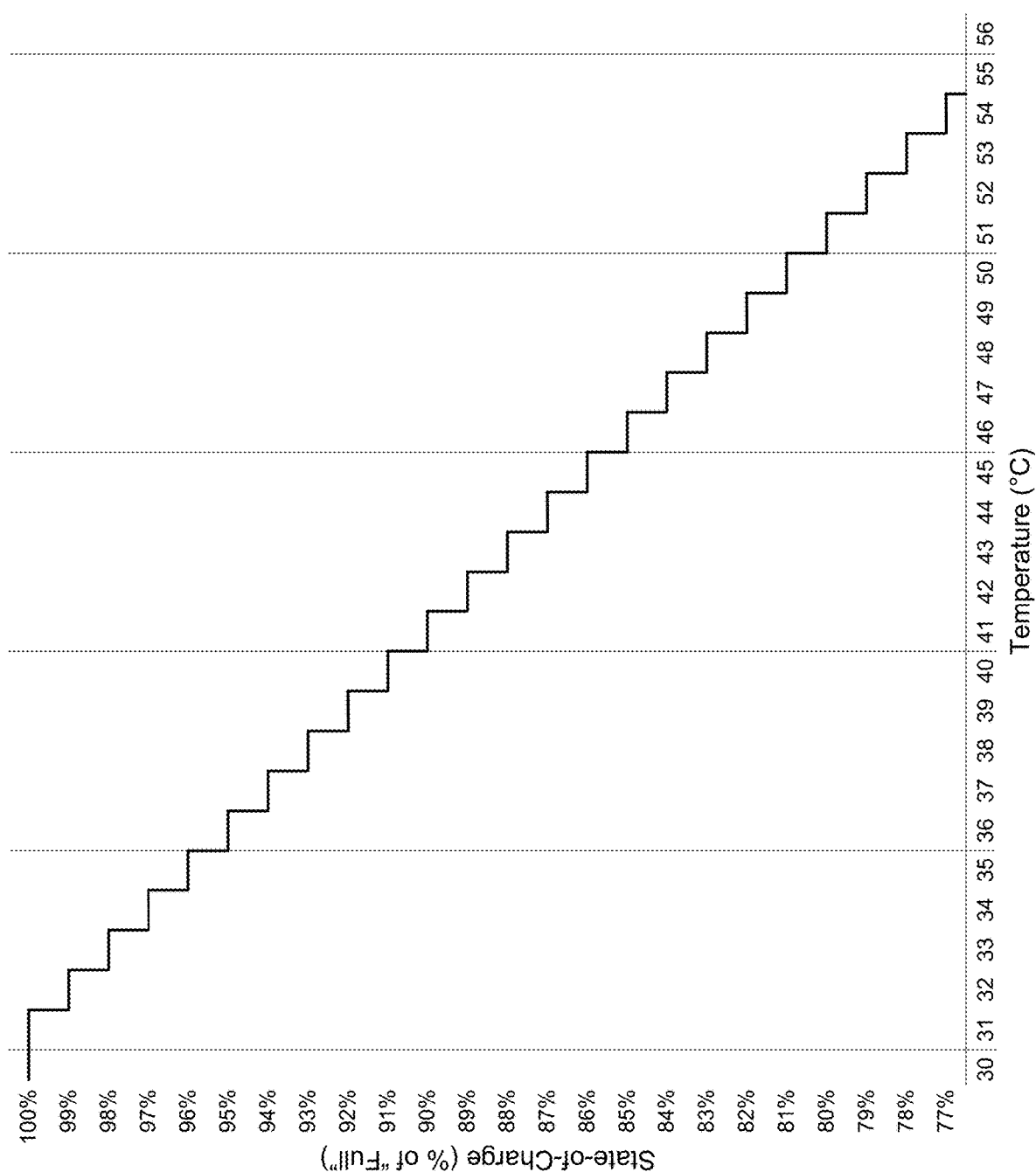
FIG. 4B is a diagram illustrating one embodiment of a second chart 410 of maximum charge levels at various temperatures.

FIG. 4B depicts a second chart 410 of maximum charge levels at various temperatures, according to embodiments of the disclosure. Here, the second chart 410 depicts the maximum charge level decreasing step-wise as the temperature of the battery increases, although at a finer granularity than that used in the first chart 400. In the example of FIG. 4B, a battery controller (such as the charge controller 225 and/or the charge controller 300) allows up to the full charge (e.g., state-of-charge at 100%) until the battery temperature reaches 32° Celsius. At this point, the battery controller restricts charging to a level less than the full charge. From 32° C. to just less than 33° C., the battery controller prevents the battery from being charged to more than 99% state-of-charge. From 33° C. to just less than 34° C., the battery controller prevents the battery from being charged to more than 98% state-of-charge. From 34° C. to just less than 35° C., the battery controller prevents the battery from being charged to more than 97% state-of-charge. In the depicted example, for each additional degree increase in battery temperature, the maximum charge level decreases step-wise by 1% state-of-charge.

Figure 4C:
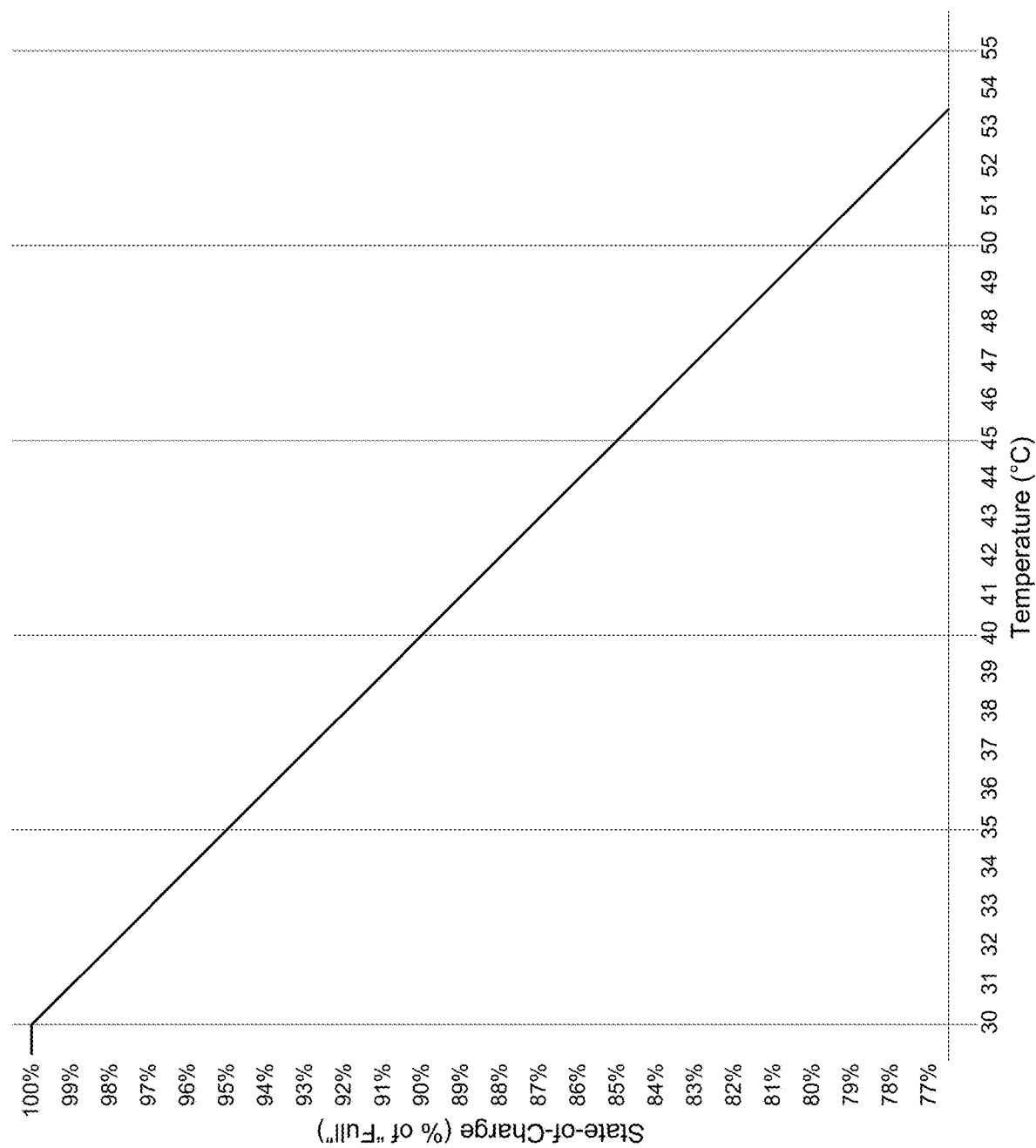
FIG. 4C is a diagram illustrating one embodiment of a third chart 420 of maximum charge levels at various temperatures, according to embodiments of the disclosure.

FIG. 4C depicts a third chart 420 of maximum charge levels at various temperatures, according to embodiments of the disclosure. Here, the third chart 420 depicts the maximum charge level decreasing linearly as the temperature of the battery increases above the threshold temperature of 30° C. In the example of FIG. 4C, a battery controller (such as the charge controller 225 and/or the charge controller 300) allows up to the full charge (e.g., state-of-charge at 100%) until the battery temperature reaches the threshold temperature of 30° C. At this point, the battery controller begins restricting the charging of the battery to a level less than the full charge, here using the equation $S_{MAX}=130-T$, where $S_{MAX}$ is the maximum charge level (expressed a percentage of the full charge) and T is the battery temperature in degrees Celsius. Thus, for a battery temperature of 37.2° C., the battery controller limits maximum charge level to 92.8% state-of-charge. For a battery temperature of 41.6° C., the battery controller would maximum charge level to 88.4% state-of-charge. For a battery temperature of 45.0° C., the battery controller limits maximum charge level to 85% state-of-charge.

FIG. 5A depicts a first set 500 of charging algorithm results, according to embodiments of the disclosure. The first set 500 includes a first charging result 505 and a second charging result 520. Here, the first charging result 505 is based on a default charging algorithm applied when a battery is charged. In the depicted example, the battery (e.g., the rechargeable battery 110) is connected to a battery charger (e.g., the charger 115) at approximately 07:00 hours and reaching 100% state-of-charge sometime between 12:00 hours and 13:00 hours. Note that smaller batteries or larger charging currents may result in the battery reaching 100% state-of-charge prior to 12:00 hours.

Moreover, the charging history of the battery may indicates that the battery/device is left connected to the charger until approximately 17:00 hours, with the battery remaining unused an at a full charge for more than 4 hours. Thus, a charging profile of the battery would indicate a pattern of times the battery becomes connected to the charger (e.g., 07:00 hours) and times the battery is disconnected from the charger (e.g., 17:00 hours). In certain embodiments, the charging profile indicates a duration of charging (e.g., 10.0 hours) and/or a typical time of reaching 100% state-of-charge.

In order to limit the amount of time the battery is unused while at a full charge, a battery controller (such as the charge controller 225 and/or the charge controller 300) implements a modified charging algorithm to produce the second charging result 520. From the charging profile, the battery controller predicts a time-of-use 510, here predicted to be 17:00 hours. The battery controller also identifies an intermediate charge level 515, here approximately 97.5% state-of-charge. The battery controller then limits charging of the battery to the intermediate charge level 515 until a release time 525 that is based on the predicted time-of-use. Here, the release time 525 is a time to permit a full charge of the battery and is determined based on the charging profile. Arrow 530 marks the point where the battery reaches full charge under the modified charging algorithm. In one embodiment, the release time 525 is a predetermined time prior to the predicted time-of-use 515. In certain embodiments, the release time 525 is based on an amount of time needed to charge the battery from the intermediate charge level to the full charge level.

In the depicted example, the battery controller modified the charging algorithm so that the battery charge level gradually reaches the intermediate charge level. However, in other embodiments, the battery controller may charge using the default algorithm until the intermediate charge level is reached. In such embodiments, the battery would be charged to the intermediate charge level at approximately 09:40 hours, rather than 13:00 hours depicted in the second charging result 520. Quicker charging may be beneficial when there is less certainty about predicted time-of-use 515 because more energy would be stored in the battery were the user to disconnect the battery from the charger prior to the predicted time-of-use 515.

Figure 5B:
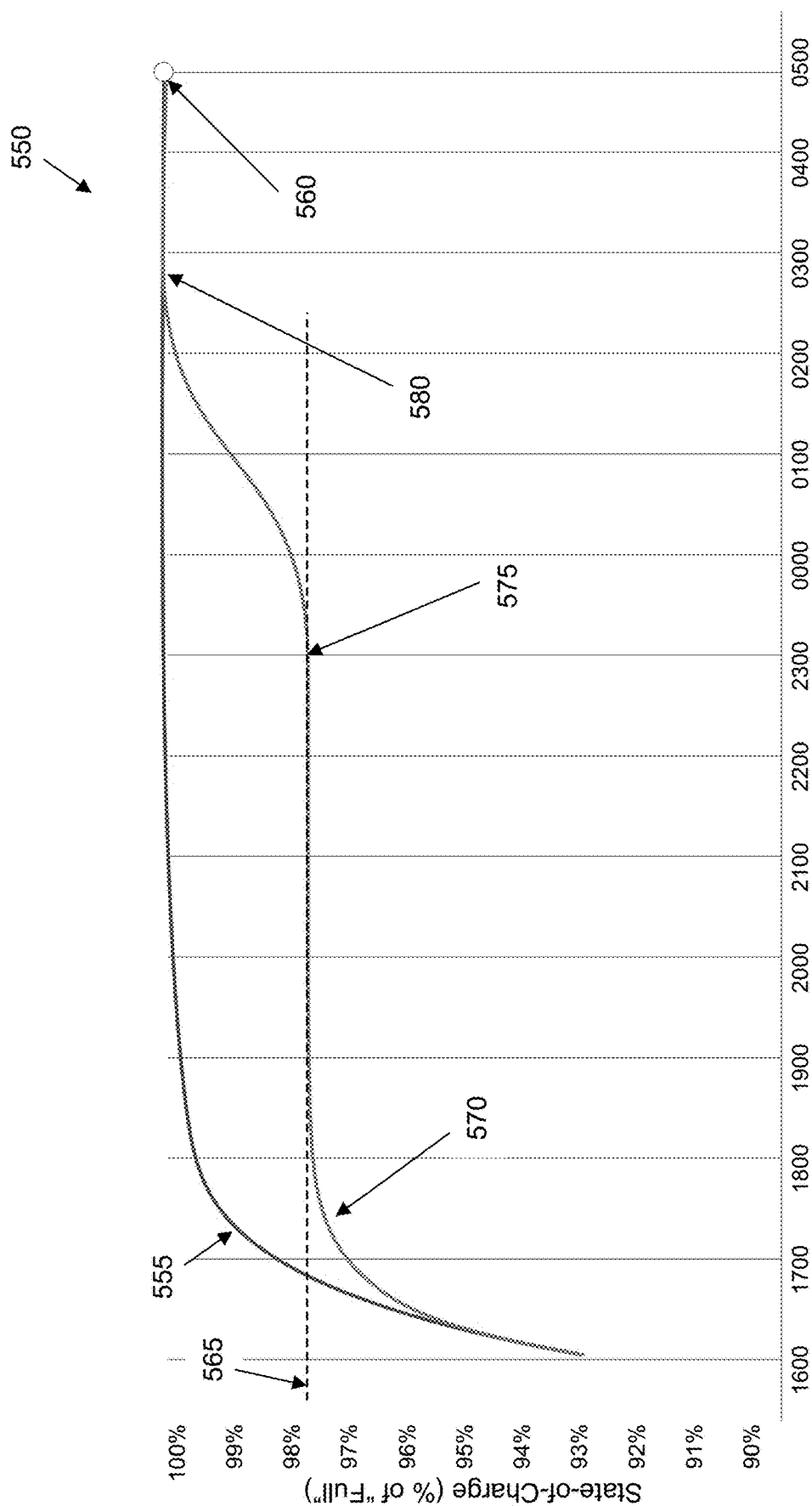
FIG. 5B is a diagram illustrating one embodiment of a second set 550 of charging algorithms, according to embodiments of the disclosure.

FIG. 5B depicts a second set 550 of charging algorithms, according to embodiments of the disclosure. The first set 550 includes a third charging result 555 and a fourth charging result 570. Here, the third charging result 555 is based on a default charging algorithm applied when a battery is charged. In the depicted example, the battery (e.g., the rechargeable battery 110) is connected to a battery charger (e.g., the charger 115) at approximately 16:00 hours and reaching 100% state-of-charge sometime between 20:00 hours and 21:00 hours. Note that smaller batteries or larger charging currents may result in the battery reaching 100% state-of-charge prior to 21:00 hours.

Moreover, the charging history of the battery may indicate that the battery/device is left connected to the charger until approximately 05:00 hours the following day, with the battery remaining unused an at a full charge for more than 8 hours. Thus, a charging profile of the battery would indicate a pattern of times the battery becomes connected to the charger (e.g., around 16:00 hours) and times the battery is disconnected from the charger (e.g., around 05:00 hours). In certain embodiments, the charging profile indicates a duration of charging (e.g., 13.0 hours) and/or a typical time of reaching 100% state-of-charge.

In order to limit the amount of time the battery is unused while at a full charge, a battery controller (such as the charge controller 225 and/or the charge controller 300) implements a modified charging algorithm to produce the fourth charging result 570. From the charging profile, the battery controller predicts a time-of-use 560, here predicted to be 05:00 hours. The battery controller also identifies an intermediate charge level 565, here approximately 98% state-of-charge. The battery controller then limits charging of the battery to the intermediate charge level 565 until a release time 575 that is based on the predicted time-of-use. Here, the release time 575 is a time to permit a full charge of the battery and is determined based on the charging profile. Arrow 580 marks the point where the battery reaches full charge under the modified charging algorithm. In one embodiment, the release time 575 is a predetermined time prior to the predicted time-of-use 565. In certain embodiments, the release time 575 is based on an amount of time needed to charge the battery from the intermediate charge level to the full charge level.

In the depicted example, the battery controller modified the charging algorithm so that the battery charge level gradually reaches the intermediate charge level. However, in other embodiments, the battery controller may charge using the default algorithm until the intermediate charge level is reached. In such embodiments, the battery would be charged to the intermediate charge level at approximately 17:45 hours, rather than 19:00 hours depicted in the second charging result 570. Quicker charging may be beneficial when there is less certainty about predicted time-of-use 565 because more energy would be stored in the battery were the user to disconnect the battery from the charger prior to the predicted time-of-use 565.

Figure 6:
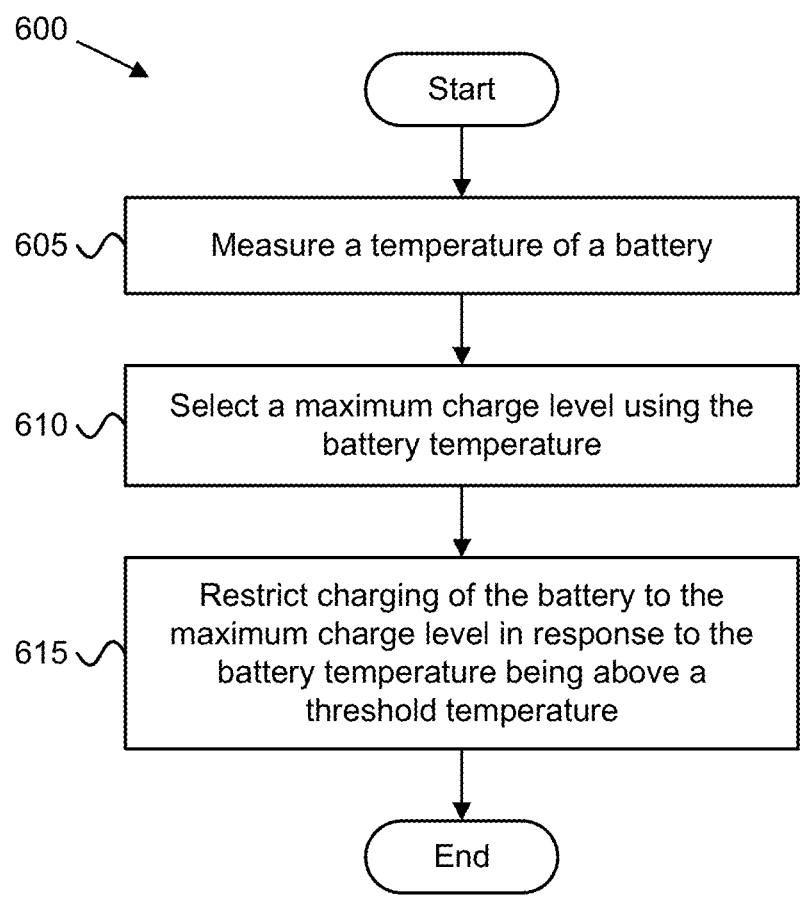
FIG. 6 is a flowchart diagram illustrating one embodiment of a method 600 for restrict charging of a battery based on battery temperature.

FIG. 6 depicts a method 600 for restrict charging of a battery based on battery temperature, according to embodiments of the disclosure. In some embodiments, the method 600 is performed using a battery controller, for example embodied in the battery device 105, the rechargeable battery 110, the charger 115, the electronic device 200, and/or the charge controller 300, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins with measuring 605 a temperature of the battery. Measuring 605 the temperature may occur by way of a temperature sensor 235. In one embodiment, a temperature module 305 measures 605 the battery temperature. Moreover, the temperature module 305 may determine whether the battery temperature exceeds a threshold temperature.

The method 600 includes selecting 610 a maximum charge level using the battery temperature. In one embodiment, a charge controller 225 and/or charge limit module 310 selects the maximum charge level using the battery temperature. In certain embodiments, the maximum charge level decreases step-wise as the temperature of the battery increases. In other embodiments, the maximum charge level decreases linearly as the temperature increases. Examples of maximum charge levels at various temperatures are depicted in FIGS. 4A-4C.

The method 600 includes restricting 615 charging of the battery to the maximum charge level in response to the battery temperature being above a threshold temperature. In some embodiments, restricting 615 charging of the battery to the maximum charge level in response to the battery temperature being above a threshold temperature includes permitting charging of the battery to a full charge level in response to the temperature of the battery being at or below the threshold temperature. The method 600 ends.

Figure 7:
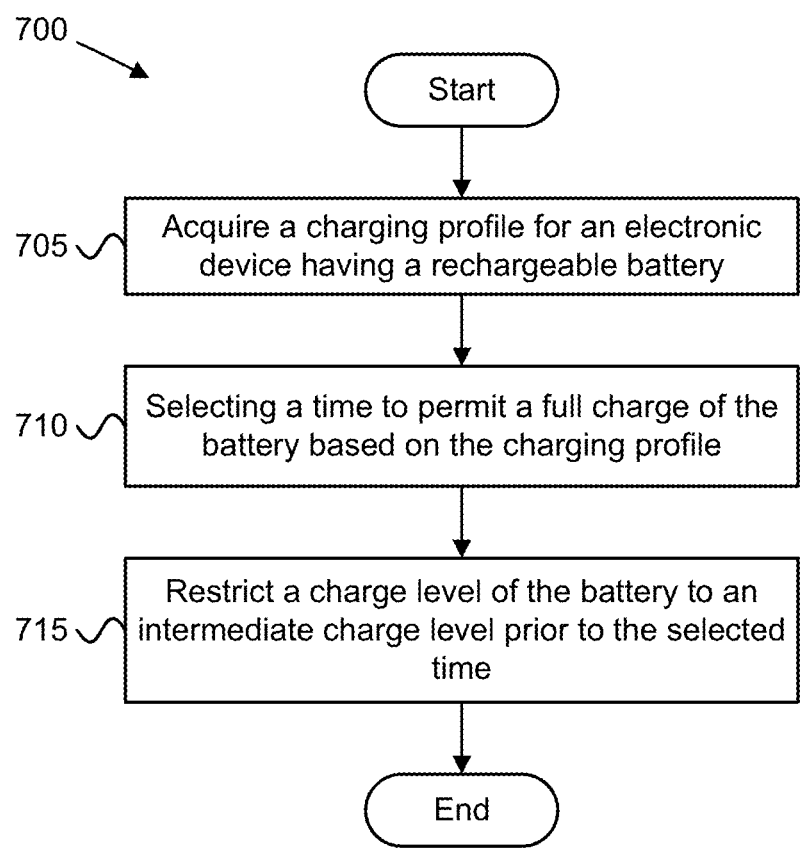
FIG. 7 is a flowchart diagram illustrating one embodiment of a method 700 for restricting charging of a battery based on a time to permit a full charge of the battery.

FIG. 7 depicts a method 700 for restricting charging of a battery based on a time to permit a full charge of the battery, according to embodiments of the disclosure. In some embodiments, the method 700 is performed using a battery controller, for example embodied in the battery device 105, the rechargeable battery 110, the charger 115, the electronic device 200, and/or the charge controller 300, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins with acquiring 705 a charging profile for an electric device having a rechargeable battery. In one embodiment, a profile module 320 acquires 705 the charging profile. In certain embodiments, the charging profile indicates a pattern of times when connecting the battery to the charger and times when disconnecting the battery from the charger. In certain embodiments, acquiring 705 a charging profile includes correlating times an electronic device containing the battery is connected to a charger, times the electronic device is disconnected from the battery, and a duration of the charging of the battery.

The method 700 includes selecting 710 a time to permit a full charge of the battery based on the charging profile. In one embodiment, the profile module 320 selects 710 a time to permit a full charge of the battery based on the charging profile. Here, the selected time may be based on a time-of-use predicted from the charging profile.

The method 700 includes restricting 715 a charge level of the battery to an intermediate level prior to the selected time. In one embodiment, the charge limiter module 315 restricts 715 a charge level of the battery to an intermediate charge level prior to the selected time. The method 700 ends.

Figure 8:
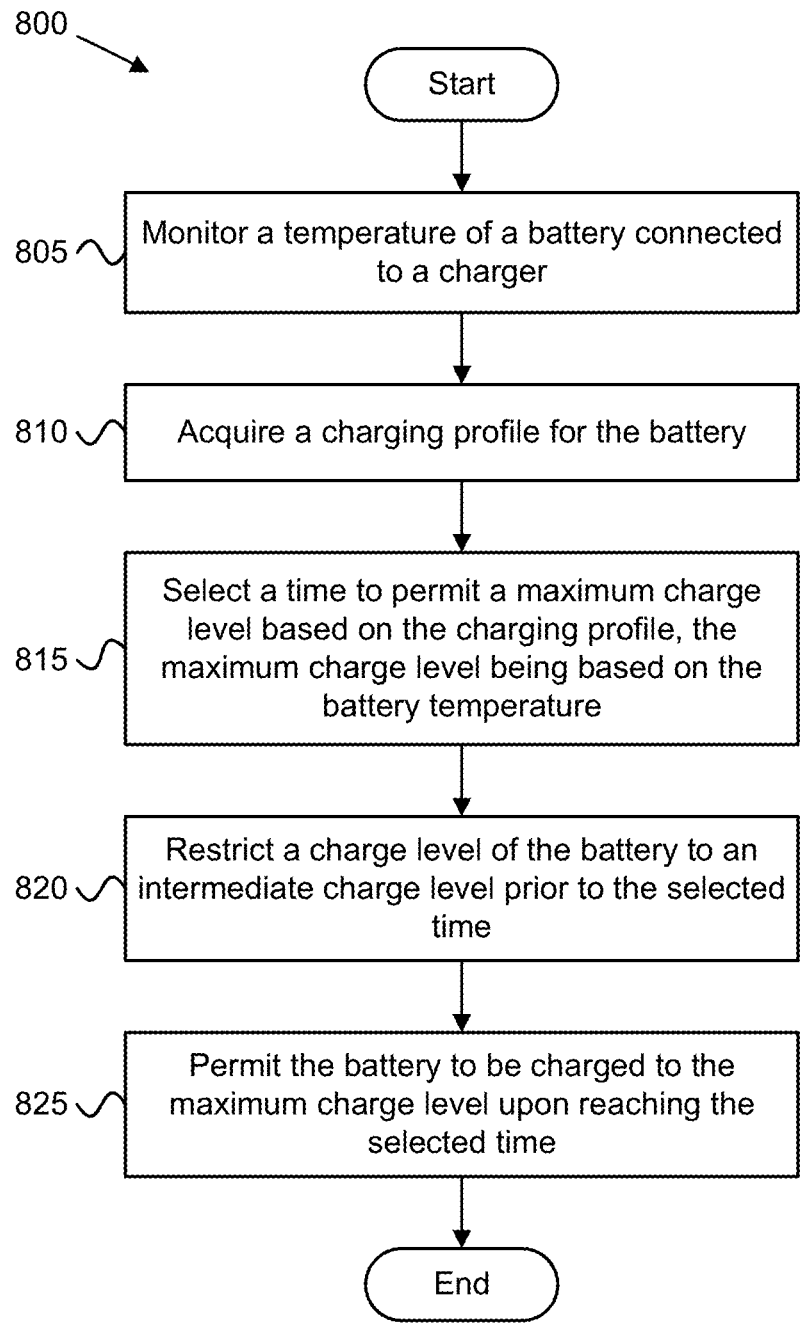
FIG. 8 is a flowchart diagram illustrating one embodiment of a method 800 for restricting charging of a battery based on both battery temperature and a time to permit a full charge of the battery.

FIG. 8 depicts a method 800 for restricting charging of a battery based on both battery temperature and a time to permit a full charge of the battery, according to embodiments of the disclosure. In some embodiments, the method 800 is performed using a battery controller, for example embodied in the battery device 105, the rechargeable battery 110, the charger 115, the electronic device 200, and/or the charge controller 300, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins with monitoring 805 a temperature of a battery connected to a charger. Monitoring 805 may occur by way of a temperature sensor 235. In one embodiment, a temperature module 305 monitors 805 the battery temperature. Moreover, the temperature module 305 may determine whether the battery temperature exceeds a threshold temperature.

The method 800 includes acquiring 810 a charging profile for the battery. In one embodiment, a profile module 320 acquires 810 the charging profile. In certain embodiments, the charging profile indicates a pattern of times when connecting the battery to the charger and times when disconnecting the battery from the charger. In certain embodiments, acquiring 810 a charging profile includes correlating times an electronic device containing the battery is connected to a charger, times the electronic device is disconnected from the battery, and a duration of the charging of the battery.

The method 800 includes selecting 815 a time to permit a maximum charge level based on the charging profile, the maximum charge level being based on the battery temperature. In one embodiment, the profile module 320 selects 815 a time to permit a full charge of the battery based on the charging profile. Here, the selected time may be based on a time-of-use predicted from the charging profile.

In one embodiment, a charge controller 225 and/or charge limit module 310 selects the maximum charge level using the battery temperature. In certain embodiments, the maximum charge level decreases step-wise as the temperature of the battery increases. In other embodiments, the maximum charge level decreases linearly as the temperature increases. Examples of maximum charge levels at various temperatures are depicted in FIGS. 4A-4C The method 800 includes restricting 820 a charge level of the battery to an intermediate level prior to the selected time. In one embodiment, the charge limiter module 315 restricts 820 a charge level of the battery to an intermediate charge level prior to the selected time. The method 800 includes permitting 825 the battery to be charged to the maximum charge level upon reaching the selected time. In one embodiment, the charge limiter module 315 permits 825 a charge level of the battery to an intermediate charge level prior to the selected time. The method 800 ends.

Figure 9:
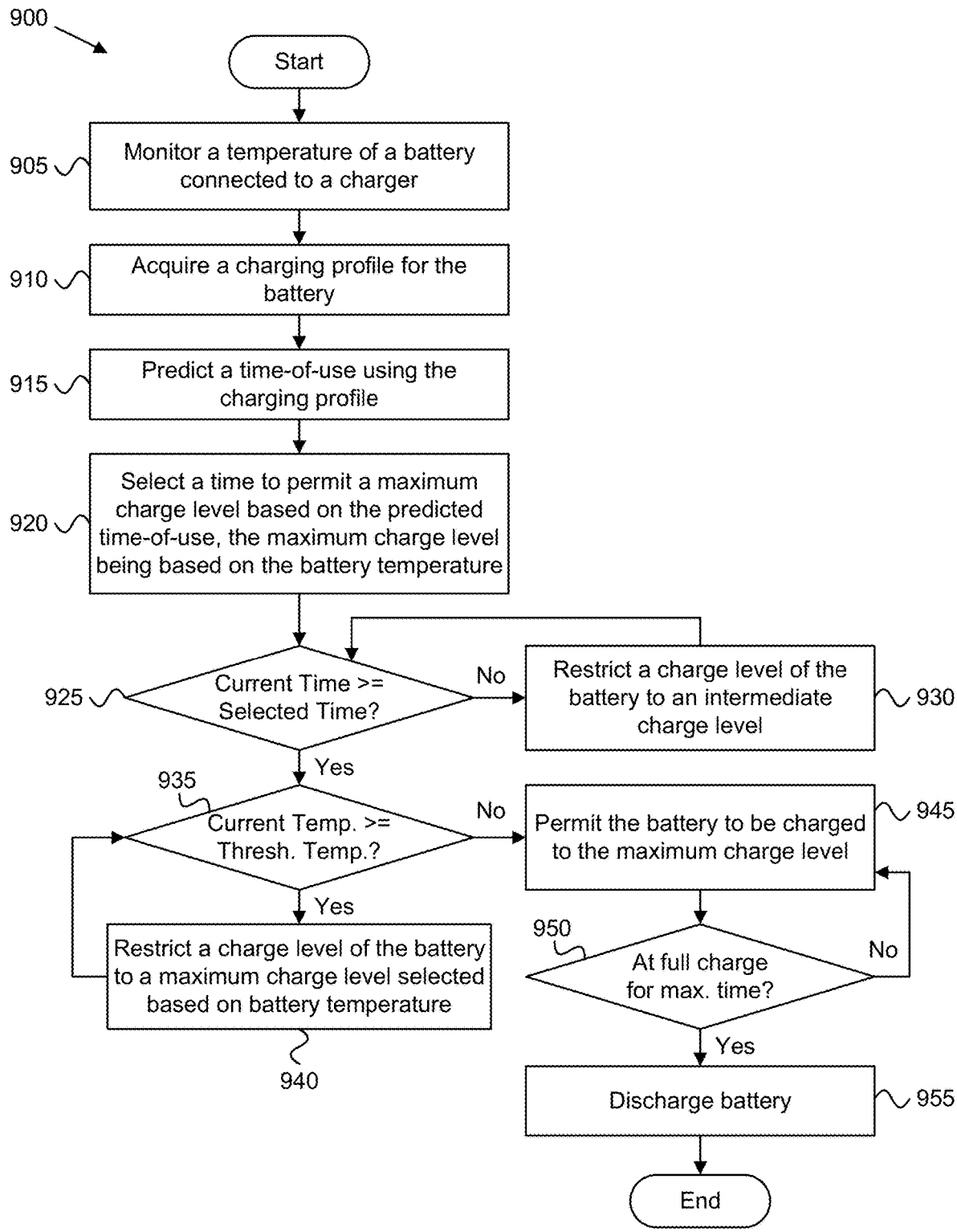
FIG. 9 is a flowchart diagram illustrating one embodiment of a method 900 for restricting charging of a battery based on both battery temperature and a predicted time-of-use.

FIG. 9 depicts a method 900 for restricting charging of a battery based on both battery temperature and a predicted time-of-use, according to embodiments of the disclosure. In some embodiments, the method 900 is performed using a battery controller, for example embodied in the battery device 105, the rechargeable battery 110, the charger 115, the electronic device 200, and/or the charge controller 300, described above. In some embodiments, the method 900 is performed by a processor, such as a microcontroller, a microprocessor, a central processing unit (CPU), a graphics processing unit (GPU), an auxiliary processing unit, a FPGA, or the like.

The method 900 begins with monitoring 905 a temperature of a battery connected to a charger. Monitoring 905 may occur by way of a temperature sensor 235. In one embodiment, a temperature module 305 monitors 905 the battery temperature. Moreover, the temperature module 305 may determine whether the battery temperature exceeds a threshold temperature.

The method 900 includes acquiring 910 a charging profile for the battery. In one embodiment, a profile module 320 acquires 910 the charging profile. In certain embodiments, the charging profile indicates a pattern of times when connecting the battery to the charger and times when disconnecting the battery from the charger. In certain embodiments, acquiring 910 a charging profile includes correlating times an electronic device containing the battery is connected to a charger, times the electronic device is disconnected from the battery, and a duration of the charging of the battery The method 900 includes predicting 915 a time-of-use using the charging profile. Here, the profile module 320 may predict 915 the time-of-use based on a pattern of times (e.g., times-of-day) the electronic device is disconnected from the battery. The method 900 includes selecting 920 a time to permit a maximum charge level based on the predicted time-of-use, the maximum charge level being based on the battery temperature. In one embodiment, the profile module 320 selects 920 a time to permit a full charge of the battery based on the charging profile.

In one embodiment, a charge controller 225 and/or charge limit module 310 selects the maximum charge level using the battery temperature. In certain embodiments, the maximum charge level decreases step-wise as the temperature of the battery increases. In other embodiments, the maximum charge level decreases linearly as the temperature increases. Examples of maximum charge levels at various temperatures are depicted in FIGS. 4A-4C.

The method 900 includes determining 925 whether a current time is equal to (or greater than) the selected time to permit a maximum charge level. If the selected time to permit a maximum charge level is not reached, then the method 900 includes restricting 930 a charge level of the battery to an intermediate level. In one embodiment, the charge limiter module 315 restricts 930 a charge level of the battery to an intermediate charge level prior to the selected time.

Otherwise, if the selected time to permit a maximum charge level is reached (or exceeded), then the method 900 includes determining 935 whether a current battery temperature is greater than or equal to a threshold temperature. If the battery temperature is greater than or equal to the threshold temperature, then the method 900 includes restricting 940 a charge level of the battery to a maximum charge level selected based on battery temperature. In certain embodiments, the intermediate charge level is less than the maximum charge level. In one embodiment, the charge limiter module 315 restricts 940 a charge level of the battery to the maximum charge level in response to the battery temperature being greater than or equal to a threshold temperature.

Otherwise, if the battery temperature is less than the threshold temperature, then the method 900 includes permitting 945 the battery to be charged to the maximum charge level. Here, the charge limiter module 315 may release the above charging restrictions so that the state-of-charge reaches 100%.

The method 900 includes determining 950 whether the amount of time the battery is at a full charge (e.g., after the selected time has passed) is equal to a maximum amount of time. In one embodiment, the charge time module 325 tracks the amount of time the battery is at a full charge. In response to the amount of time the battery is at a full charge reaching the maximum amount of time, the method 900 includes discharging 955 the battery, e.g., by a predetermined amount. In certain embodiments, the discharge module 330 discharges the battery until the state of charge is no longer 100%. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a battery;
a temperature sensor that measures a temperature of the battery;
a processor; and
a memory that stores code executable by the processor to:
 select a maximum charge level using the temperature of the battery, where the maximum charge level becomes less than a full charge level of the battery in response to the battery temperature being above a threshold temperature;
 acquire a charging profile of the battery, the charging profile indicating a pattern of times when connecting the battery to the charger and times when disconnecting the battery from the charger;
 select a time to permit a full charge of the battery based on the charging profile; and
 restrict charging of the battery to an intermediate charge level prior to the selected time in response to the temperature of the battery being above the threshold temperature, the intermediate charge level being a predetermined percentage of the maximum charge level.

2. The apparatus of claim 1, wherein the processor adjusts the maximum charge level as the temperature of the battery changes.

3. The apparatus of claim 1, wherein the maximum charge level decreases linearly as the temperature increases.

4. The apparatus of claim 1, wherein the maximum charge level decreases step-wise as the temperature of the battery increases.

5. The apparatus of claim 1, wherein the threshold temperature is selected based on a battery chemistry of the battery.

6. The apparatus of claim 1, wherein the processor permits charging of the battery to a full charge level in response to the temperature of the battery being at or below the threshold temperature.

7. The apparatus of claim 1, wherein the processor allows the battery to charge to the full charge level upon reaching the selected time, wherein the intermediate charge level is based on the battery temperature.

8. The apparatus of claim 1, wherein the processor monitors an amount of time the charge level of the battery remains at the full charge level; and
 discharges the battery to an intermediate charge level in response to the time the charge level of the battery remains at the full charge level reaching a threshold amount of time.

9. The apparatus of claim 8, wherein the intermediate charge level is based on the battery temperature.

10. A method comprising:
selecting a maximum charge level using a temperature of a battery, where the maximum charge level becomes less than a full charge level of the battery in response to the battery temperature being above a threshold temperature;
acquiring, by use of a processor, a charging profile for an electronic device having a rechargeable battery, the electronic device coupled to a charger;
selecting a time to permit a full charge of the battery based on the charging profile; and
restricting a charge level of the battery to an intermediate charge level prior to the selected time in response to the temperature of the battery being above the threshold temperature, the intermediate charge level being a predetermined percentage of the maximum charge level.

11. The method of claim 10, further comprising allowing the battery to charge to the full charge upon reaching the selected time.

12. The method of claim 10, wherein the charging profile indicates a pattern of times when connecting the battery to the charger and times when disconnecting the battery from the charger.

13. The method of claim 10, further comprising predicting a time-of-use based on the charging profile, wherein the time to permit the full charge of the battery is a predetermined interval prior to the predicted time.

14. The method of claim 10, further comprising:
monitoring a temperature of the battery;
selecting a maximum charge level using the temperature of the battery, where the maximum charge becomes less than a full charge level of the battery in response to the battery temperature being above a threshold temperature.

15. The method of claim 14, further comprising:
restricting charging of the battery to the maximum charge level in response to the temperature of the battery being above the threshold temperature; and
permitting charging of the battery to a full charge level in response to the temperature of the battery being at or below the threshold temperature.

16. The method of claim 10, further comprising:
monitoring an amount of time the charge level of the battery remains at the full charge level; and
discharging the battery to the intermediate charge level in response to the time the charge level of the battery remains at the full charge level reaching a threshold amount of time.

17. A program product comprising a computer readable storage medium that stores code executable by a processor, the executable code comprising code that:
- monitors a temperature of a battery connected to a charger;
- select a maximum charge level using the temperature of the battery, where the maximum charge level becomes less than a full charge level of the battery in response to the battery temperature being above a threshold temperature;
- acquires a charging profile for the battery, the charging profile indicating a pattern of times when connecting the battery to the charger and times when disconnecting the battery from the charger;
- selects a time to permit the maximum charge level based on the charging profile;
- restricts charging of the battery to an intermediate charge level prior to the selected time in response to the temperature of the battery being above the threshold temperature, the intermediate charge level being a predetermined percentage of the maximum charge level; and
- permits charging of the battery to the maximum charge level upon reaching the selected time.

18. The program product of claim 17, further comprising code that:
- predicts a time-of-use based on the charging profile, wherein the selected time is a predetermined interval prior to the predicted time-of-use.

19. The program product of claim 17, wherein the maximum charge level is less than a full charge level in response to the battery temperature being above a threshold temperature, wherein permitting charging of the battery to the maximum charge level upon reaching the selected time comprises charging the battery to the full charge level in response to the battery temperature being less than or equal to the threshold temperature.

20. The program product of claim 17, further comprising code that:
- adjusts the maximum charge level as the temperature of the battery changes.

* * * * *